United States Patent [19]

Dubach et al.

[11] 4,011,156

[45] Mar. 8, 1977

[54] METHOD FOR ELIMINATING ORGANIC AND INORGANIC BOUND NITROGEN FROM DOMESTIC AND INDUSTRIAL WASTE WATER

[75] Inventors: Max Dubach; Alfred Scherler, both of Riedholz, Switzerland

[73] Assignee: Cellulose Attisholz, AG, Luterbach, Switzerland

[22] Filed: July 12, 1974

[21] Appl. No.: 488,064

Related U.S. Application Data

[63] Continuation of Ser. No. 308,130, Nov. 20, 1972, abandoned.

[30] Foreign Application Priority Data

Nov. 23, 1971 Switzerland ............... 17030/71

[52] U.S. Cl. .......................... 210/8; 210/16; 210/18; 210/DIG. 28; 210/10
[51] Int. Cl.² ............................. C02C 1/06
[58] Field of Search ............ 210/18, 16, 15, 4–8, 210/17, 10, 9, 3, 44, 11

[56] References Cited

UNITED STATES PATENTS

| | | | |
|---|---|---|---|
| 2,562,510 | 7/1951 | Schlenz | 210/5 |
| 3,345,288 | 10/1967 | Sontheimer | 210/10 |
| 3,480,144 | 11/1969 | Barth et al. | 210/18 |
| 3,579,439 | 5/1971 | Meiring et al. | 210/5 |
| 3,617,542 | 11/1971 | Boehler et al. | 210/18 |
| 3,642,617 | 2/1972 | Brink et al. | 210/44 |
| 3,654,147 | 6/1974 | Levin et al. | 210/16 |

OTHER PUBLICATIONS

Johnson, W. K. et al.; *Nitrogen Removal by Nitrification and Denitrification*, Journal W.P.C.F., vol. 36, Aug. 1964, pp. 1015–1036 (P.O.S.L.).

*Primary Examiner*—Charles N. Hart
*Assistant Examiner*—Benoit Castel
*Attorney, Agent, or Firm*—Werner W. Kleeman

[57] ABSTRACT

A method of eliminating organic and inorganic bound nitrogen from domestic and industrial waste water in a biological waste water treatment plant consisting of two in series connected stages each containing an aeration tank and a subsequently connected settling basin. Waste water entering the treatment plant will be aerated in the first stage aeration tank and subsequently will be introduced for settling into the settling basin, where the overflow is removed free of oxygen and introduced into the second stage where it will be again aerated and subsequently introduced into the settling basin of the second stage. According to the invention there are carried out the steps of aerating the waste water which is free of oxygen containing ammonia and removing it from the settling basin of the first stage to the aeration tank of the second stage while providing favorable conditions for as extensive as possible nitrification of the ammonia, continuously recirculating a portion of the waste water nitrified in this manner from the settling basin of the second stage to the first stage, and denitrifying such recirculated portion of the waste water in the settling basin of the first stage where there are provided favorable conditions for the ammonification of the organic bound nitrogen and for the denitrification of the nitrate in the influent and the nitrate in the recirculated effluents.

31 Claims, 1 Drawing Figure

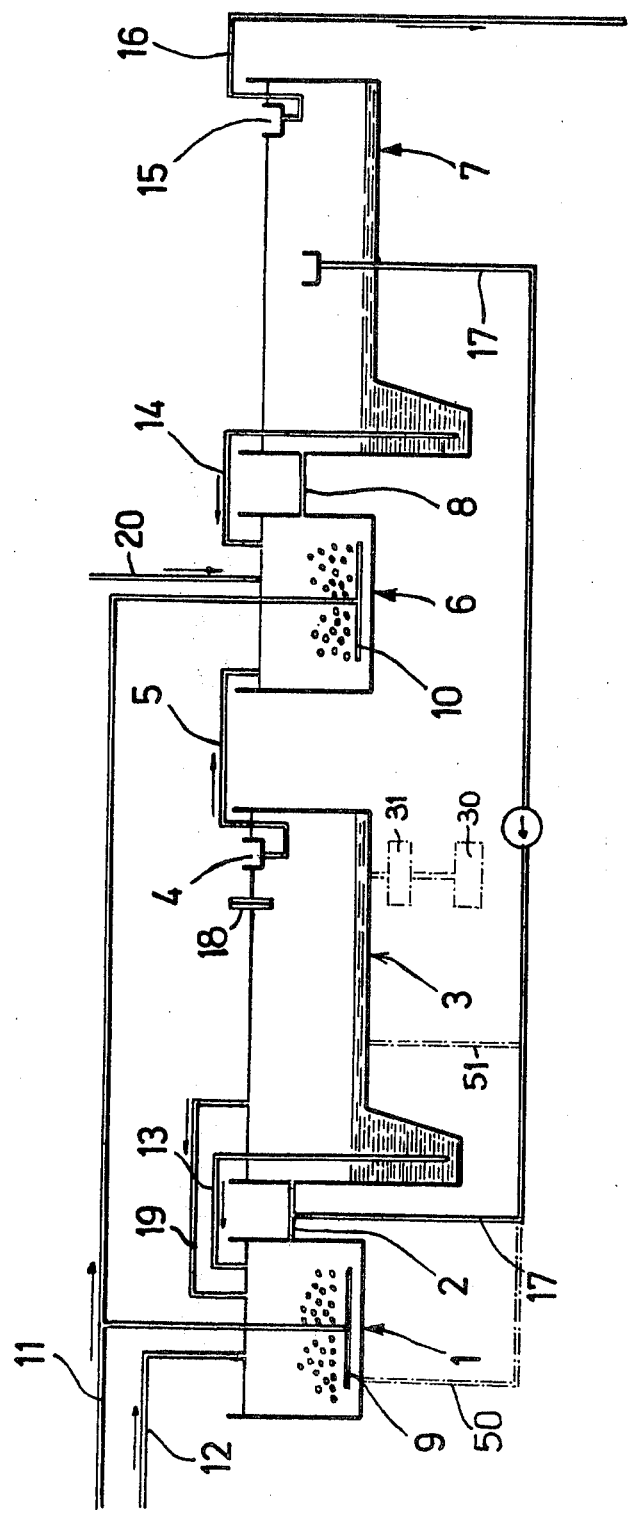

METHOD FOR ELIMINATING ORGANIC AND INORGANIC BOUND NITROGEN FROM DOMESTIC AND INDUSTRIAL WASTE WATER

CROSS-REFERENCE TO RELATED CASE

This application is a continuation of our commonly assigned copending U.S. application Ser. No. 308,130 filed Nov. 20, 1972, now abandoned.

BACKGROUND OF THE INVENTION

The present invention relates to a new and improved method of eliminating organic and inorganic bound nitrogen from domestic and industrial waste water.

There is already known to the art a process for the biological purification of waste water or sewage according to the activated sludge technique in which decomposition of the wastes or contaminants is carried out, on the one hand, by bacteria and the removal of the increased bacteria by bacteria-consuming organisms, in two successive completely separate stages. In so doing, the waste water or sewage delivered to the first stage, if desired mechanically pre-clarified, is aerated in an aeration tank or vessel while providing optimum conditions for the life of the bacteria. The concentration of oxygen is chosen such that the clarified or purified discharge of a settling tank or basin associated with the first stage and following the aeration tank and into which following aeration there is fed the sewage, after a certain residence time, no longer contains any free oxygen. This sewage which is free of oxygen and removed from the settling basin is now again aerated in an aeration tank at the second stage and the sludge concentration is regulated such that the discharge from a settling basin associated with the second stage and arranged after the aeration tank of the second stage, after a certain residence time, possesses an oxygen content of at least 2 mg/l.

Owing to the deposit of domestic and industrial sewage into natural waters its content of ammonium- and nitrate nitrogen compounds is continuously increased. Ammonium constitutes a danger for such natural waters since with increased pH-values such is toxic to fish or with nitrification can lead to oxygen depletion of the water. On the other hand, the nitrate acts as a fertilizer and causes increasing eutrophication of the water. Furthermore, it renders more difficult or endangers processing of such water for drinking purposes, since nitrates when present in too great a concentration can lead to possible health hazards to human and animal life. The high ammonia and nitrate content of natural water is also, among other things, brought about by an insufficient elimination of these substances by previously known conventional biological waste water treatment techniques and processes, inclusive of the aforementioned process.

Hence there is present a real need for waste water treatment techniques and processes capable of eliminating to the greatest possible extent ammonium and nitrate substances as well as organically bound nitrogen. Different proposals aim at nitrifying in known manner the ammonium in an activated sludge process and to de-nitrify the nitrate-enriched effluent in a special subsequent stage. During nitrification and de-nitrification the following is to be observed:

With nitrification in an activated sludge system ammonia nitrogen substances are microbiologically oxidized into nitrites and nitrates. A large proportion of the organic bound nitrogen which cannot be absorbed or otherwise consumed is transformed into ammonia-nitrogen by ammonifying bacteria. The conversion of ammonia to nitrite is effected by means of "nitrosomonas" bacteria, the conversion of nitrite into nitrate is effected by the "nitrobacter".

It is presumed that the growth rate of nitrosomonas is smaller than nitrobacter so that the former presents a limiting factor for nitrification. Whether nitrification is possible in an activated sludge installation is dependent upon different factors, among others, temperature, aeration time, sludge concentration, sludge load, oxygen content and inhibitors such as the pH-value.

Nitrification is basically only then possible if under certain conditions a certain sludge load is not exceeded. With sludge loads exceeding 0.2 kg $BOD_5$/kg DS (wherein the symbol $BOD_5$ represents the biological oxygen demand for 5 days and symbol DS signifies dry solids) at a temperature range below 15° C there does not occur any or only a very unsatisfactory nitrification. At 20° C and a sludge load up to 0.33 kg $BOD_5$/kg DS it is possible to obtain complete nitrification.

The presence of different toxic substances in the sewage can hinder nitrification. In particular, thiourea, cyanide, phenols and heavy metal salts can inhibit the growth of nitrifying bacteria.

During denitrification nitrite and nitrate are reduced into elementary nitrogen and nitrous oxide. This can be expressed by the following equation.

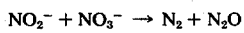

The mechanism of denitrification has not been yet fully clarified. Generally, this process is considered as a strictly anaerobic process. Basically hydrogen donors appear to be necessary for denitrification. Apart from the influence of the oxygen content during denitrification the pH-value and the residence time plays a role. There has been noticed a correlation between the pH-value and the influence of the oxygen potential upon the denitrification rate. At a pH-value exceeding 7 denitrification in the presence of oxygen is totally inhibited.

In summation it is to be mentioned that with all trials undertaken there could be determined the interrelationship between sludge concentration and time as well as the temperature and sludge load during nitrification. Similarly it was recognized that denitrification is basically possible.

SUMMARY OF THE INVENTION

Starting from these determinations the present invention provides a new and improved method wherein so-to-speak simultaneously with the usual purification of sewage or waste water and without any appreciable additional expenditure it is possible to realize an extensive elimination of ammonium-, nitrate and organically bound nitrogen from domestic and industrial sewage.

A further significant object of the present invention relates to an improved method of eliminating organic and inorganic bound nitrogen from domestic and industrial sewage and wherein all of the essential operational steps are carried out under the most favourable possible conditions.

This occurs in a biological waste water or sewage purification installation of the previously mentioned species, that is of the type having two series connected stages, each containing an aeration tank and a subsequently connected settling basin. The waste water is aerated in the aeration tank of the first stage and subsequently fed for settling into the settling basin thereof. The waste water is then removed free of oxygen from the settling basin and fed into the aeration tank of the second stage, where it is again aerated and subsequently fed into the settling basin of the second stage. According to the invention the oxygen-free waste water containing ammonia which has been removed from the settling basin of the first stage is aerated in the aeration tank of the second stage while providing the most favourable conditions for as complete as possible nitrification of the ammonia. A portion of the waste water nitrified in this manner is removed from the settling basin of the second stage and continuously recirculated back into the first stage and denitrified in the settling basin of the first stage in which favourable conditions are provided for the ammonification of the organic bound nitrogen and for the denitrification of the nitrates of the infed waste water and the nitrates circulated back with the purified waste water.

In so doing, at the second stage owing to the very low $BOD_5$-sludge load and high age of the sludge there can be satisfied the very small growth rate of nitrobacter and especially nitrosomonas. At the settling basin of the first stage there are provided favourable or optimum conditions for denitrification, wherein the low sludge load with the thus required high sludge quantity in this first stage simultaneously affords a protection of the nitrifying bacteria in the second stage, in that toxic substances for the most part are at least partially absorptively retained at the first stage and partially biologically decomposed. At the same time the ammonifying action in the reducing medium of the settling basin is intensified.

Consequently, without disturbing decomposition of the remaining contaminants in the usual way and while utilizing the prevailing conditions favourable for the ammonification and nitrification or denitrification within the installation, there is obtained up to 90% elimination of the total nitrogen contained in the waste water delivered to the treatment plant.

To optimize such elimination advantageously at least one-half of the nitrified waste water delivered to the settling basin of the second stage during a period of 24 hours is again introduced from this basin into the first stage and/or measures can be undertaken so that approximately the same amount or more of the purified nitrified water is again infed into the first stage as this stage simultaneously has delivered thereto during 24 hours unpurified waste water for purification.

With an installation with irregular waste water or sewage infeed it is possible to advantageously operate in a manner that the hydraulic load of the installation is maintained constant, adjusted to the contemplated peak load. With a smaller amount of waste water or sewage for this purpose there can be fed back as much of the purified nitrified waste water from the settling basin of the second stage into the first stage as is necessary to maintain constant the hydraulic load of the first stage.

The waste water fed back from the settling basin of the second stage for denitrification in the first stage can be either introduced into the aeration tank or into the settling basin of the first stage. An advantageous particularly intimate admixture of this recirculated portion with the water of the first stage can be, however, realized in that the recirculated water is introduced into the connection conduit between the aeration basin and the settling basin of the first stage.

In order to obtain optimum or favorable conditions for the ammonification and denitrification in the first stage if there is processed an $O_2$— concentration of 0–2 mg $O_2$/l and a sludge concentration of 5–15 kg $DS/m^3$, the $BOD_5$-sludge load can be advantageously between 0.5–0.05, preferably at 0.15 kg/$BOD_5$/kg DS, wherein at least two-thirds of the sludge present in the entire first stage is continuously located in the settling basin of such stage. The sludge load is calculated from the quantity in kg $BOD_5$ flowing in with the waste water or sewage to the first stage for a period of 24 hours, divided by the total sludge quantity in kg contained in the first stage. The sludge age, which is determined by the sludge quantity located in the total first stage divided by the daily sludge quantity located in the total first stage divided by the daily sludge quantity in kg growing from the sewage or the infed sludge quantity, can amount to 5 to 30 days, preferably about 12 days. At the same time measures can be undertaken to ensure that the sludge transferred to the settling basin of the first stage on the average after at least one, but at most eight hours, preferably after three hours, again arrives at the associated aeration basin and is there supplied with oxygen. This can occur with an appropriate calculation of the recycled sludge quantity, for instance on an hourly basis amounting to one-fifth to one-half, preferably one-quarter of the settling basin contents. Since gas bubbles appear within the sludge flocks during denitrification processes a portion of the sludge floats to the surface of the basin. This sludge can be skimmed off in known manner and fed back into the associated aeration tank or withdrawn as excess sludge.

Owing to these measures there are attained particularly favourable conditions for the ammonification and denitrification, since owing to the high residence time of the sludge at the settling basin the need for oxygen becomes so great that the nitrate is reduced without impairing elimination of the biologically decomposable organic substances. Quite to the contrary such elimination is further intensified owing to the additional infeed of oxygen via the nitrate, whereby at the same time there is possible a saving in energy since the oxygen infeed can be reduced in the aeration of the first stage.

In order to obtain favourable or optimum conditions for the nitrification in the second stage when working with oxygen concentrations of 2–6 mg $O_2$/l and a sludge concentration of 0.5–4kg $DS/m^3$, it is possible for the $BOD_5$-sludge load, extensively dependent upon the temperature, to amount to 0.3–0.01, preferably 0.1 kg $BOD_5$/kg DS. The age of the sludge can amount to 5 to 30 days, preferably 12 days. At the same time care can be undertaken to ensure that the sludge transferred to the settling basin, after one-quarter hour but at most after four hours, preferably after one hour, again arrives at the associated aeration basin and there is supplied with oxygen. Advantageously, at least half of the sludge present in the entire second stage is continuously present at the associated settling basin. The recycled or fed back sludge quantity is advantageously selected, for instance such that it amounts per hour to one-fifth to one-half, preferably one-quarter, of the settling basin volume.

Owing to these measures there are provided particularly favourable conditions for nitrification, especially owing to the low $BOD_5$-sludge load, owing to the waste water which has already been extensively pre-purified in the first stage and because of the thus attained high sludge age. In particular when proceeding in this manner there is especially prevented the occurrence of denitrification phenomena in the settling basin of the second stage which can lead to the known sludge propelling or driving which impairs nitrification and also the out-flow quality.

Furthermore, it has been found that apart from the decomposition of the organic contaminants and the elimination of the nitrate-nitrogen and without impairing these operations, there additionally can be eliminated the phosphates contained in the sewage to be purified. This can occur in that there are added known precipitants or precipitation agents or chemicals, for instance aluminum or iron salts, to the second stage forwardly of the settling basin thereof.

BRIEF DESCRIPTION OF THE DRAWINGS

The invention will be better understood and objects other than those set forth above, will become apparent when consideration is given to the following detailed description thereof. Such description makes reference to the annexed drawing wherein the single FIGURE thereof schematically illustrates an exemplary embodiment of installation suitable for carrying out the method of this invention.

DETAILED DESCRIPTION OF THE APPARATUS FOR USE IN THE PERFORMANCE OF THE METHOD

Considering now the drawing the single FIGURE illustrated therein depicts a known two-stage biological sewage purification installation embodying a first aeration tank 1 and a subsequently arranged settling basin 3 connected therewith via a conduit 2 or the like. The first aeration tank 1 and the subsequent series connected settling basin 3 collectively form the first stage of the installation. By means of an overflow 4 and a conduit 5 the settling basin 3 of the first stage is connected with a second aeration tank 6 which, in turn, is connected through the agency of a conduit 8 with a further settling basin 7. The second aeration tank or container 6 together with the therewith series connected settling basin 7 forms the second stage of the illustrated installation. The aeration operations at the aeration tanks or containers 1 and 6 occur through the agency of suitable discharge members or aerators 9 and 10 which are connected to a common infeed line or conduit 11.

The domestic or industrial sewage or waste water to be purified and freed from ammonium and nitrate-nitrogen arrives, either or not pre-clarified, via a conduit 12 continuously at the aeration tank 1 of the first stage and subsequently via the conduit 2 at the associated subsequently connected settling stage having a post-purification basin 3. In this first process stage the quantity of oxygen introduced, during the known aeration time with air, via the conduit 11 and the discharge member 9 and the concentration of the biological sludge are matched to one another such that the clarified or purified discharge to the conduit 5 of this first process stage no longer contains any free oxygen at the settling basin 3. The $BOD_5$-sludge load, based upon the total quantity of sludge in the aeration tank 1 and in the settling basin 3, amounts to 0.15 kg $BOD_5$ per kg dry solids. A third of this total sludge quantity is located at the aeration tank 1, two-thirds at the settling basin 3. By means of the sludge feedback conduit 13 there is recycled back into the aeration tank so much sludge that this quantity corresponds to one-quarter of the settling basin content per hour. The upwards ascending or floating sludge which collects at the water surface of the basin 3 is held back by an immersed baffle 18 and delivered by means of a suitable device via a conduit 19 back again into the aeration tank 1. As a result, there are attained favourable conditions for denitrification of the nitrate as well as also for ammonification.

There is removed from the settling basin 3 via the discharge or outflow through 4 the waste water which is free of oxygen and which contains the portion of suspended material which cannot be settled as well as the ammonium and via the conduit 5 such is delivered to the aeration tank 6 of the second stage and then via the conduit 8 into the subsequently connected settling basin 7. In the aeration tank 6 there is again carried out for the known aeration time with air, via the conduit 11 and the discharge member 10, an accommodation of the infed quantity of oxygen and the sludge concentration such that the now purified water flowing out of the settling basin 7 via overflow 15 and conduit 16 still contains at least 2 mg/l, preferably 4 mg/l free oxygen. The $BOD_5$-sludge load, based upon the total sludge content in the aeration tank 6 and in the settling basin 7 amounts to 0.1 kg $BOD_5$/kg DS. Approximately two-thirds of the total quantity of sludge is continuously located in the aeration tank 6, one-third in the settling basin 7. The quantity of sludge fed back via the conduit 14 amounts to one-quarter of the total volume of the settling basin 7 per hour. As a result, there are realized favourable conditions for the nitrification of the ammonium in the second stage.

Furthermore, in this second stage for the additional elimination of phosphates from the waste water to be purified and without disturbing the remaining operations in this stage and particularly without disturbing nitrification there can be added via conduit 20 known precipitation agents or chemicals, such as aluminum- or iron salts, and specifically advantageously prior to entry of the water in the settling basin 7, for instance at the aeration tank 6, as illustrated.

Furthermore, it has been found that in certain situations it can be advantageous if, for improving the sedimentation properties at the second stage, there is additionally added known organic and/or inorganic flocculation agents, for instance betonite, cellulose fibers or anionic, cationic or non-ionic flocculation promoting agents. These agents do not disturb in any manner the desired nitrification process.

In order to denitrify the ammonium nitrification in the second process stage and therefore to eliminate nitrate-nitrogen from the waste water to be purified there is only removed from the settling basin 7 a portion, preferably at least 50 percent of the nitrified waste water or sewage, delivered to the settling basin 7 during a period of 24 hours and which is then recirculated back to the first stage of the installation where favourable conditions prevail for the denitrification of the nitrified nitrogen compounds. Thus, the installation is advantageously regulated such that in the first stage for denitrification there is introduced approximately the same amount of water from the settling basin 7 as such contains non-purified waste water or sewage from the conduit 12 during a period of 24 hours.

It has been found to be advantageous if the waste water which is to be again delivered to the first stage is removed from the settling basin of the second stage approximately at a depth of 0.2 to 2 meters, preferably at 0.8 meters below the waste water level. This removal means has been schematically depicted in the drawings by a conduit 17 which recycles back the removed waste water or the like into the conduit 2 where an intimate admixture occurs with the waste water present in the first stage. According to further variants of the invention it would be also possible to introduce the waste water removed for recirculation from the settling basin 7, instead of into the conduit 2, also into the aeration tank 1, as indicated by the schematically indicated conduit 50 or else to introduce such into the settling basin 3 of the first stage as indicated schematically by the conduit 51.

Due to denitrification in the first stage the sludge, owing to the microgas bubbles contained in part in the sludge flocks, is much more difficult to concentrate or thicken. Therefore, it can be advantageous to degasify the excess sludge withdrawn from this stage prior to initiation of sedimentation, in a concentrator or thickener of conventional construction. As schematically indicated in the drawing this can take place in that the sludge prior to its introduction into the concentrator 30 is mechanically stirred in a tank or container 31 during one to seven hours, preferably three hours, without the infeed of air, so that the major portion of the gas bubbles are removed.

A further possibility of concentrating or thickening the excess sludge without thus having a disturbing action from the micro-bubbles can reside in the features that such, instead of being sedimentated, is concentrated by flotation in a known system suitable for this purpose.

While there is shown and described present preferred embodiments of the invention, it is to be distinctly understood that the invention is not limited thereto, but may be otherwise variously embodied and practiced within the scope of the following claims.

What is claimed is:

1. A method of eliminating organic and inorganic bound nitrogen from domestic and industrial waste water in a biological activated sludge waste water purification installation capable of directly processing unclarified waste water comprising two stages connected in series for producing biologically treated waste water containing sludge in each stage, each stage containing an aeration tank and a subsequently connected settling basin, wherein the waste water is aerated in the first stage and is subsequently introduced into the settling basin of the first stage where a clarified effluent is transferred into the second stage aeration tank where it is again aerated and subsequently introduced into the settling basin of the second stage, the improvement comprising the steps of: aerating influent waste water containing organic and inorganic bound nitrogen in the aerating tank of the first stage and ammonifying the organic bound nitrogen, transferring the ammonified waste water which also contains nitrates therein to the settling basin of the first stage where denitrification of the nitrate occurs, said aeration step being controlled to maintain a substantially zero oxygen level in the clarified effluent leaving the first stage settling basin, transferring the clarified effluent from the settling basin of the first stage which is substantially free of oxygen and containing ammonia to the aeration tank of the second stage and aerating to an oxygen level of at least about 2mg/l to provide an aerobic condition in the second stage for nitrification of the ammonia to nitrates, continuously recirculating a portion of the clarified effluent from the settling basin of the second stage and which contains nitrates back into the first stage, and denitrifying the recirculated portion of the waste water in the first stage.

2. The method as defined in claim 1, wherein the age of the sludge in the first stage is in the range of 5 to 30 days.

3. The method as defined in claim 1, including the step of again recycling the sludge present in the settling basin of the first stage after a period of one to eight hours back into the associated aeration tank of such first stage.

4. The method as defined in claim 3, wherein the amount of recycled sludge per hour amounts to one-fifth to one-half of the volume of the settling basin.

5. The method as defined in claim 1, including the step of recycling the sludge collecting at the surface of the waste water in the settling basin of the first stage into the aeration tank thereof.

6. The method as defined in claim 1, including the step of removing as excess sludge the sludge collecting at the surface of the water of the settling basin of the first stage.

7. The method as defined in claim 1, including the steps of withdrawing sludge from the first stage, mechanically agitating for a period of one to seven hours the sludge withdrawn from the first stage, and thereafter feeding such sludge into a concentrator.

8. The method as defined in claim 1, including the steps of withdrawing sludge from the first stage, and concentrating the sludge withdrawn from the first stage by flotation.

9. The method as defined in claim 1, wherein at least no more than one-half of the quantity of sludge present in the second stage is continuously located in the settling basin thereof.

10. The method as defined in claim 1, wherein the age of the sludge in the second stage amounts to 5 to 30 days.

11. The method as defined in claim 10, including the step of recycling a quantity of sludge per hour which amounts to one-fifth to one-half of the volume of the settling basin of the second stage back into the aeration tank thereof.

12. The method as defined in claim 1, wherein sludge in the settling basin of the second stage is recycled back into the associated aeration tank thereof after a period of one-quarter to 4 hours.

13. The method as defined in claim 1, including the step of recirculating back into the first stage at least one-half of the purified nitrified waste water delivered to the settling basin of the second stage during a period of 24 hours from such settling basin.

14. The method as defined in claim 13, wherein approximately as much purified nitrified waste water is again delivered to the first stage as there is delivered non-purified waste water to such stage.

15. The method as defined in claim 1, including the step of maintaining the hydraulic load of the first stage approximately constant.

16. The method as defined in claim 15, wherein for the purpose of maintaining approximately constant the hydraulic load during irregular waste water infeed there is employed purified nitrified waste water from an overflow of the settling basin of the second stage.

17. The method as defined in claim 1, wherein the purified nitrified waste water recirculated back to the first stage is removed from the settling basin of the second stage at a depth of 0.2 to 2 meters below the waste water level thereof.

18. The method as defined in claim 17, wherein the said depth of removal is at approximately 0.8 meters below the waste water level thereof.

19. The method as defined in claim 1, wherein the portion of the purified nitrified waste water circulated back from the settling basin of the second stage to the first stage is introduced into the aeration tank of the first stage.

20. The method as defined in claim 1, wherein the portion of the waste water circulated back from the settling basin of the second stage into the first stage is introduced into the settling basin of the first stage.

21. The method as defined in claim 1, wherein the portion of the water circulated back from the settling basin of the second stage into the first stage is introduced into a connection between the aeration tank and the settling basin of the first stage.

22. The method as defined in claim 1, wherein for the purpose of additionally eliminating phosphates without disturbing nitrification there is added to the second stage precipitation chemicals.

23. The method as defined in claim 22, wherein the precipitation chemicals are selected from aluminum salts and iron salts.

24. The method as defined in claim 22, including the step of adding such precipitation chemicals to the waste water prior to its entry into the settling basin of the second stage.

25. The method as defined in claim 22, wherein such precipitation chemicals are added to the aeration tank of the second stage.

26. The method as defined in claim 1, wherein for improving the sedimentation properties there is added to the second stage flocculants.

27. The method as defined in claim 1, wherein for improving the sedimentation properties there is added to the second stage a precipitation agent.

28. The method as defined in claim 1, including the step of providing a $BOD_5$-sludge load in the first stage ranging from 0.05 to 0.05kg $BOD_5$ per kg dry solids.

29. The method as defined in claim 28, including the step of continuously maintaining at least two-thirds of the quantity of sludge contained in the first stage present in the settling basin of such stage.

30. The method as defined in claim 1, including the step of providing a $BOD_5$-sludge load in the second stage ranging from 0.01 to 0.3kg $BOD_5$ per kg dry solids.

31. A method of eliminating organic and inorganic bound nitrogen from domestic and industrial waste water in a biological activated sludge sewage purification installation capable of directly processing unclarified waste water comprising two stages connected in series, each stage containing an aeration tank and a subsequently connected settling basin, wherein the waste water is aerated in the first stage and is subsequently introduced into the settling basin of the first stage where a clarified effluent is transferred into the second stage aeration tank where it is again aerated and subsequently introduced into the settling basin of the second stage, the improvement comprising the steps of: aerating influent waste water containing organic and inorganic bound nitrogen in the aerating tank of the first stage and ammonifying the organic bound nitrogen, transferring the ammonified waste water which also contains nitrates therein to the settling basin of the first step where dentrification of the nitrate occurs, said aeration step being controlled to maintain a substantially zero oxygen level in the clarified effluent leaving the first stage settling basin, transferring the clarified effluent from the settling basin of the first stage which is essentially free of oxygen and containing ammonia to the aeration tank of the second stage and aerating to an oxygen level of at least about 2mg/l to provide an aerobic condition in the second stage for nitrification of the ammonia in the waste water to nitrates, continuously recirculating a portion of the clarified effluent from the settling basin of the second stage and which contains nitrates back into the first stage, and denitrifying the recirculated portion of the waste water in the first stage where there are provided favorable conditions for the ammonification of the organic bound nitrogen and for the denitrification of the nitrate in the influent and the nitrate in the recirculated effluent, the provision of said favorable conditions including recirculating approximately as much purified nitrified waste water to the first stage as there is delivered non-purified waste water to such first stage, and maintaining approximately constant the hydraulic load of the first stage.

* * * * *